US009413761B2

(12) United States Patent
Herberger et al.

(10) Patent No.: US 9,413,761 B2
(45) Date of Patent: Aug. 9, 2016

(54) SYSTEM AND METHOD FOR VISUAL CONTENT SHARING IN AN ONLINE ENVIRONMENT

(75) Inventors: Tilman Herberger, Dresden (DE); Titus Tost, Dresden (DE)

(73) Assignee: SHAREA, LTD. (GB)

( * ) Notice: Subject to any disclaimer, the term of this patent is extended or adjusted under 35 U.S.C. 154(b) by 1767 days.

(21) Appl. No.: 12/048,985

(22) Filed: Mar. 14, 2008

(65) Prior Publication Data

US 2008/0229211 A1 Sep. 18, 2008

Related U.S. Application Data

(60) Provisional application No. 60/894,734, filed on Mar. 14, 2007.

(51) Int. Cl.
*H04L 29/06* (2006.01)
*H04L 29/08* (2006.01)

(52) U.S. Cl.
CPC ............... *H04L 63/10* (2013.01); *H04L 67/06* (2013.01); *H04L 67/36* (2013.01)

(58) Field of Classification Search
USPC ............ 715/764, 810; 709/219; 345/173
See application file for complete search history.

(56) References Cited

U.S. PATENT DOCUMENTS

| 6,191,807 B1 | 2/2001 | Hamada et al. |
| 7,127,501 B1 | 10/2006 | Beir et al. |
| 8,196,055 B2 * | 6/2012 | Zotov et al. .................. 715/764 |
| 2002/0008719 A1 | 1/2002 | Miyawaki et al. |
| 2004/0199514 A1 | 10/2004 | Rosenblatt et al. |
| 2005/0091595 A1 | 4/2005 | Shappell et al. |
| 2005/0289237 A1 | 12/2005 | Matsubara et al. |
| 2006/0136828 A1 | 6/2006 | Asano |
| 2006/0168000 A1 | 7/2006 | Bodlaender |

FOREIGN PATENT DOCUMENTS

| JP | 08272715 A | 10/1996 |
| JP | 2005209212 A | 8/2005 |

* cited by examiner

*Primary Examiner* — Jeffrey A Gaffin
*Assistant Examiner* — Mandrita Brahmachari
(74) *Attorney, Agent, or Firm* — Fellers, Snider, Blankenship, Bailey & Tippens, P.C.; Terry L. Watt

(57) ABSTRACT

There is provided herein a system and method for content sharing over the Internet, wherein the user creates visual representations of specific content share sections and, by graphically accessing and interacting with these visual representations, the user is able to quickly, efficiently and easily create multi-user content sharing environments, thereby still retaining full control over all specific shares. With this graphical approach the accessibility and understanding of the user regarding content sharing over the Internet is enhanced, therewith allowing even the casual user of computers to initiate content sharing.

19 Claims, 6 Drawing Sheets

SYSTEM AND METHOD FOR VISUAL CONTENT SHARING IN AN ONLINE ENVIRONMENT

FIELD OF THE INVENTION

The present invention relates generally to the field of data and content sharing over a network connection. More particularly, but not by way of limitation, the present invention relates generally to methods of accessing and controlling access to data via the Internet.

BACKGROUND OF THE INVENTION

It is well known that the way that a user interacts with a computer is much different today than it was even a few years ago. Each component part of the user interface (including, e.g., the operating system) has undergone a tremendous evolution in functionality since the first personal computer appeared. Although today things are much better than they were in the era of command-line interfaces, the current metaphor for dealing with the operating system, i.e., the desktop metaphor, is at least 20 years old.

The desktop metaphor has become the predominant method of allowing a user to interact with a computer. Its visual approach to file manipulation was adopted early on by operating systems from Atari®, Amiga®, and Macintosh® and continues today in virtually every modern operating system. The many advantages of using a desktop-based approach should be clear to anyone who has ever used such. Among those advantages are, that the user need not memorize a complex command syntax as is required, for example, in Unix; that individual files are easily located and manipulated (e.g., copied, deleted, duplicated, etc.), the desktop metaphor is well suited to use with a mouse or other pointing device, the workings of the software desktop in many ways mimic the user's actual desktop which makes training a user who is new to this approach much easier than it might be otherwise, etc.

The desktop is the point of entry for the typical user who seeks to access and manipulate data and content on his or her personal computer. As has been mentioned previously, the desktop has also undergone a variety of developmental steps, wherein the core functions remained more or less unchanged, but additional functionality has been added. The functionality improvements depend, of course, to some extent on the operating system in question and include, introduction of the "dock" (Mac OS X™), the taskbar (Windows®), the quick launch bar (Windows®), and the use of small information aggregating programs (Widgets/Gadgets) that are connected to the Internet to provide the user with dynamic information regarding, for example, weather and/or stock developments, etc.

The increasing availability of widgets or gadgets illustrates another development trend. Over the last 10 years, the Internet has developed into a global medium for communication of data to the point where its importance in the everyday lives of its users has grown to the same level as that of TV, radio or print media. This development can be attributed to the evolution of the Internet from a simple network which was originally designed to facilitate the transfer of publications and data between academics into a network through which all manner of multimedia and other data (e.g., video, audio, etc.) are available and transferable.

This transformation of the Internet into a medium accessible by the consumer in ever growing numbers naturally led businesses onto the Internet. Initially, these companies were only interested in displaying their own company information on their website. However, today there is a mass migration of business interests onto the Internet which, in extreme cases, has resulted in businesses that have no presence outside of that network. Obvious examples of such businesses include Google® and Yahoo®, whose main business is the provision of search services to the user which is funded, of course, by the sale of advertisements/placement of advertisements that a user views along with their search results.

Of course, the companies listed previously are not the only ones that have adopted the "whole-business-into-the-Internet" model. Salesforce® for example is providing hosted software solutions to its customers. Amazon® is another well-known company that does not have a brick and mortar presence and is reachable by its customers only via the Internet. Further, familiar desktop applications are similarly being migrated onto the Internet. Applications such as word processing, spreadsheet, and calendar software, etc., which have traditionally been desktop-based, are becoming increasingly available via the Internet. The pricing model of this sort of software is in flux, with pay-per-use models and low cost (or free) open-source products being made available via this approach.

Developments in the business world, however, do little to help the situation of the average user who would similarly like to exploit the power of the Internet for his or her personal purposes. The computer industry has done a good job of teaching users how to operate within the desktop environment but has done little to extend that model beyond the user's own personal computer. However, the user who ventures out on the Internet will be forced to interact with web sites that utilize a different operational metaphor, e.g., the "hyperlink" metaphor. Within a web browser, the familiar desktop metaphor is replaced by applications running within multiple windows and a user interface that relies on completely different operating conventions, conventions that would be used on a Windows desktop (e.g., in most situations a user cannot "drag" a file from within a browser and "drop" it on the desktop in order to download it).

Thus, this mass migration onto the Internet has necessitated a paradigm shift on the part of the casual user who was just becoming familiar with the desktop approach.

However, a more recent development in Internet user interfaces involves the use of web-tops or web-desktops, wherein these web-desktops represent the online form of the standard desktop with which the user is familiar. In brief, a web desktop is a "virtual desktop" on the web. Web-desktops feature functionality that is typically available as part of the standard desktop metaphor including, for example, mouse-based control, the availability of familiar applications such as calculator, email, word processing, media player, etc.

Web-desktops utilize, more or less, the familiar "desktop" metaphor as a means of allowing the user to control the Internet experience. This approach typically allows a user to interact with the Internet in familiar ways and, in some cases, further allows the execution of remote (or local) applications. Additionally, in some cases the web-tops provide for functionality such as instant messaging, chat or file sharing, etc. One advantage of web desktops is that they are designed to allow a user to save files and settings over the Internet rather than just to the local desktop.

A typical approach to file sharing via a network is static and is administered and controlled by a strict order of events which is suited to accommodate the logic of the computer rather than the needs of a user. The sorts of steps that are typically required in order to initiate file sharing typically include: selection of the file or folder that is to be shared, specification of how the selected file or folder is to be shared (the assignment of access rights), and, identification of who can access the folder or file (including specification of information that uniquely identifies each authorized user or group). To correctly obtain and enter the information required by these steps is a complex and involved process.

As a consequence, a casual user may find it very difficult to distribute and control access to files, folders or information, in general, to other users. This is especially true in instances where there are multiple files and/or possibly multiple recipients. In cases where multiple files, folders, and or users are involved, correctly specifying access rights may prove to be a task too complex for the average user. Further, after such rights are established it can be very difficult to determine, after the fact, what rights were granted to whom and with respect to which item, i.e., it can be difficult to see the big picture. Unfortunately, the state of the art in web desktops does not provide much help for the user who is attempting to arrange for file sharing within a networked environment. Of course, the standard command-line driven approach (e.g., "chmod 664") is totally unsuitable for the novice.

Thus what is needed is a method that addresses the above mentioned problems, a method that offers a sharing approach in the web-desktop environment, and that incorporates sharing of a multitude of different data and is not limited to the sharing of single files or folders. The method should feature a completely new approach to the information sharing problem and provide the user with a graphical method of specifying access permissions Accordingly it should now be recognized, as was recognized by the present inventors, that there exists, and has existed for some time, a very real need for a system and method that would address and solve the above-described problems.

Before proceeding to a description of the present invention, however it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of the invention within the ambit of the appended claims.

SUMMARY OF THE INVENTION

There is provided herein a system and method of data sharing in an online environment, wherein the online environment includes any number of Internet based web-desktops of different users. The instant invention provides an originating user with a graphical approach to data sharing, wherein a user is able to quickly and easily create a content-sharing environment that involves multiple users, typically in a manner of minutes. The system preferably allows a user to manage the file-sharing environment in real time by interacting with a graphical display that is drawn on his or her desktop. In the preferred arrangement, each individual (or group of individuals) will be associated with a graphical region on the user's desktop. By increasing or decreasing the size of this graphical region or by moving the graphical regions to create overlapping areas, additional files may be shared or excluded from sharing, respectively. Similarly, by moving icons that are representative of the files between different graphical regions, permissions may be added or removed.

Additionally, the real time interactivity aspect of the instant invention makes it possible for the user to remain in control of what type of information is transferred or shared with which user. The system is designed to simplify the process of sharing data between users in an online environment by using a graphical user driven process.

Turning now to a discussion of the preferred embodiments of the instant invention, the instant invention preferably allows an initiating user to define and create an information-sharing environment by manipulation of regions that have been drawn on a web-desktop. The regions that are drawn on the desktop will preferably be simple geometric shapes such as circles, squares, rectangles, etc, although more complex shapes could certainly be used. In one preferred embodiment, each region will be associated with files having a common content or subject matter. For example, the user might create one geometric object that is designed to contain personal data items such as pictures from family and friends. Another region might be for the work-related data. Another might be associated with recreational activities, such as hobbies, etc. In the preferred arrangement, at the time the region is created, the user will provide identifying information with respect to users who will be allowed to view and/or modify it, etc. In a preferred arrangement, the geometric regions will be displayed within the web-desktop of the initiating user. Users that have been identified as potential share partners will then get access to the geometric objects—and files associated therewith—once they sign in to their own web-desktop.

The participating (receiving) users will subsequently be able to access and share the content and data that has been made available to them by the initiating user. The receiving user will begin by accessing his or her own local web-desktop. In a preferred arrangement, data that is to be made available to this user will automatically appear (at least in icon form) on his or her desktop within a region that is representative or similar (at least in concept) to the region that was created/displayed on the initiating user's desktop. Preferably, a remote server will be used as an intermediary between the initiating and receiving users. This server will preferably have accounts assigned to the initiating and each of the receiving users. Additionally, the server will preferably store files that are intended to be transferred.

The instant invention features a unique approach to the problem of content sharing in online environments wherein, in a first embodiment, an initiating user can easily configure and control the sharing rights associated with a file or group of files. In short, in a first embodiment, the user who initiates the sharing process retains all the control regarding who is to be made a part of the sharing environment, which content is shared, and which access rules will control distribution of the content that is to be shared.

According to the preferred first embodiment, the instant invention preferably begins with the activation of the "sharea" function within the confinements of the web-desktop environment of an individual user. The user will typically be already logged in to his or her own web-desktop and will activate the sharing functionality by initiating a command (e.g., from a pull down menu) provided for that purpose. Once the "sharea" functionality has been activated, the user will preferably be able to initiate the next step from anywhere within the web-desktop. The "sharea" functionality will preferably be fully integrated into the functionality of the web-desktop and, as part of that integration, the "sharea" functionality will preferably be implemented as an extension of the web-desktop environment. That is, preferably no application window will be created when the "sharea" functionality is initiated.

In a next preferred step the user will create (e.g., draw using the mouse, select from a menu, etc.) a geometric object of an arbitrary form and dimension on the web-desktop. This geometric object will be a visual representation of the share area—one "sharea" of the user. The information regarding the created geometric object will preferably be transferred to the server that is responsible for managing the web-desktop environment. Preferably, the server will be continuously updated during the sharing process (e.g., as regions are created/moved and content is added/removed). The information that is continuously transferred to the server will preferably describe the size and dimension of the geometric object and additionally the position of the geometric object on the web-desktop of at least the initiating user. So, in addition to the other functions mentioned previously, the server will typically be responsible for associating a region of the web desktop with a specific individual user or user group.

In a next preferred step, the user will be allowed to define the content of the created "sharea"—which will first preferably be done by labeling the "sharea" and afterwards by adding specific documents or data to the "sharea". Additionally, the user will preferably be able to add user names to the created "sharea", wherein the user names will preferably be provided by a module of the web-desktop of the individual user. Preferably, the user will add the user name or names to the list of users who will be allowed access to the created "sharea" by selecting them from the list of contacts from the contacts module. Additionally, the user will preferably be able to specify individual access rights to the users including, for example, full access to all documents in the "sharea", (e.g., create, view and delete rights), or only partial access to the documents in the "sharea (e.g., only read access).

As a next preferred step, the user will create at least one more geometric object on the web-desktop. The specific information regarding the size and dimension of the geometric object will again preferably be transferred to the server and stored there. In a preferred arrangement, the transfer will take place as soon as the graphic object is created on the desktop.

When the next geometric object is created, in a preferred arrangement the same order of events will preferably be followed. That is, in a preferred arrangement the user will label the newly-created geometric object and will select which users will be allowed to access the files associated with this geometric object and, thus, the data contained therein.

The data that is added to each geometric object will preferably be displayed on the desktop in a manner that allows a user to quickly determine what type of file or data is shared within the individual geometric object. Each file will preferably be represented by a thumbnail-type icon. Those of ordinary skill in the art will understand that a thumbnail is a graphic representation of a computer file that provides a reduced-size representation of a file type and/or its contents. The icon type might be determined, for example, by reference to the file extension which might be, for example, a ".jpg" which indicates a digital image file, or a ".doc" file which is associated with a word processing document, etc. Additionally, and in some preferred arrangements, the user will be provided with a convenient way of viewing the content of each individual file. For example, in case of an .mp3 file a user might be able to listen to, say, the first 30 seconds of the file through the use of a miniature version of a media player application. Of course, similar file content applications could be provided for other file types.

After user identifications are associated with a new or existing geometric object, the instant invention will preferably automatically inform the users that they have been added to the "sharea" of another user. If the user is online at the time when his or her user I.D. is associated with a particular shared area, the user will be immediately notified. On the other hand, if the user is not online, the server will preferably store that information until such time as the user is logged in again. In a preferred arrangement, when the invited user is next online, the "sharea" of the initiating user will be displayed on the web-desktop of the recipient user. Preferably, the complete "sharea" will not be displayed, but instead the instant invention will preferably only display the portion of the "sharea" to which the user has been given access by the initiating user. As has been discussed previously, the display of a "sharea" on the recipient user's desktop indicates to that user that the file is available for viewing, downloading, or modification/deletion if the associated "sharea" permissions allow the latter.

In the next preferred step, the initiating user will have the option to relocate the geometric objects on his or her web-desktop. More particularly, the user will be allowed and encouraged to create overlaps or intersecting regions by placing one region on top of another. In a preferred arrangement, the intersecting graphical regions on the user's screen will be associated with access privileges (e.g., UNIX permissions) for the shared files, thereby providing the user with an intuitive means of allowing and disallowing access by users or groups to specific files. File icons that are placed within intersecting regions are files that may be accessed by more than one user. This approach allows a user to visually distribute content between multiple users. Additionally, the initiating user can readily change the content or rules of sharing at any time and can control shared files by simply manipulating onscreen graphic objects.

The interaction with the geometric objects is preferably carried out via common mouse-based and/or keyboard-based techniques. Data sharing is intended to include, without limitation, the sharing of files and folders.

Additionally, in some preferred arrangements the information within a file might be selectively shared using a similar approach. For example, the initiating user might wish to share the contact information of another user, and the instant invention will preferably allow that user to add an icon representing the contact information into a created "sharea" and the instant invention will thereafter automatically insert the contact information associated with the icon into the contact module of the receiving user when the user selects to move the data icon to his web-desktop. In some embodiments, the instant invention will ask the receiving user for permission before inserting the information into the contact module. Generally speaking, the sharing process will be carried out via the well-known "drag and drop" principle, wherein the users drag icons representative of documents and files from the sharea to their individual web-desktops where the files will be stored.

It should be clear that an approach such as this would be a tremendous aid to the user of the popular web-desktop application who wishes to quickly and easily share content with other users and who does not have the knowledge or patience to create specific access permissions for individual folders or files within his or her web-desktop application. The instant invention provides the user with an easy-to-use content sharing system, which features a visual approach to the sharing theme, wherein the user remains in control both in terms of shared content and regarding the users who are part of individual "shareas". The method and system simplifies the sharing concept to the creation of geometric objects and the movement of these objects to create "shareas" and intersections between these "shareas" to share content within a plurality of different users or user groups. The whole process is supported by the graphical user interface of the instant invention therewith guiding both the initiating user as well as the users who have been added to the added user list.

The foregoing has outlined in broad terms the more important features of the invention disclosed herein, so that the detailed description that follows may be more clearly understood, and so that the contribution of the instant inventors to the art may be better appreciated. The instant invention is not limited in its application to the details of the construction and to the arrangements of the components set forth in the following description or illustrated in the drawings. Rather the invention is capable of other embodiments and of being practiced and carried out in various other ways not specifically enumerated herein. Additionally, the disclosure that follows is intended to apply to all alternatives, modifications and equivalents as may be included within the spirit and the scope of the invention as defined by the appended claims. Further, it should be understood that the phraseology and terminology employed herein are for the purpose of description and should not be regarded as limiting, unless the specification specifically so limits the invention.

BRIEF DESCRIPTION OF THE DRAWINGS

Other objects and advantages of the invention will become apparent upon reading the following detailed description and upon reference to the drawings in which.

DESCRIPTION OF THE PREFERRED EMBODIMENTS

Figure 1:
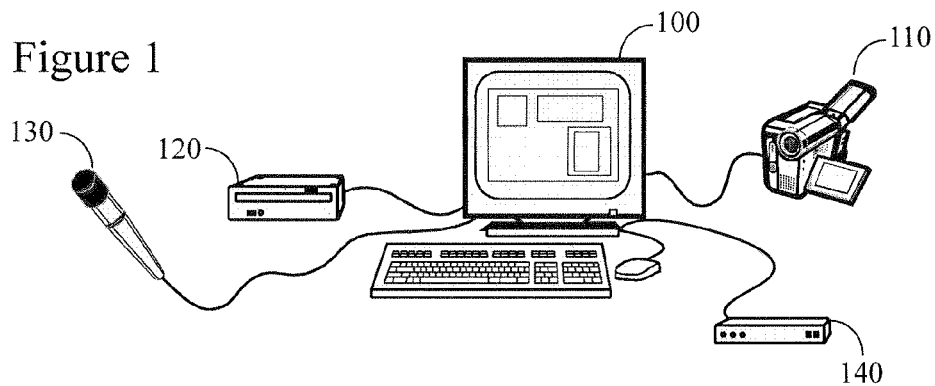
FIG. 1 depicts the general working environment of the instant invention.

Referring now to the drawings, wherein the reference numerals indicate the same parts throughout the several views, there is provided a system and method for visual content sharing over the Internet, wherein the system and method allows for an easy, efficient and flexible creation of multi-user shared-file environments and thereby allows the user to keep full control over the individual access permissions or rights by using a visual/graphical approach. The instant invention enables the user to create a sharing environment with a minimum of steps within the confines of a web-desktop user interface, wherein each specific setting regarding access rights is defined as part of the creation process embedded in the number of steps.

By way of general explanation and in accord with the preferred embodiment, it is to be understood that when the phrase "visual content sharing over the Internet" is used herein that usage will preferably be broadly interpreted as meaning providing a way for a user of an Internet based web-desktop to share files by creating and manipulating on-screen geometrical objects, each being associated with or containing one or more computer files and each of these objects is associated with user-specified access permissions based, for example, on individual users, user groups, etc. Additionally, the instant invention allows the user to quickly generate new shareas by freely positioning the on-screen regions so as to create intersections therebetween.

For purposes of the instant embodiment it should be understood that the invention preferably seeks to provide a visual sharing concept for users of Internet-based web-desktops. The instant invention will allow the user flexibility when creating shareas for his or her individual data and additionally allows the user to supply the specific shareas with data about specific user groups with access to the shareas, all preferably based on a graphical-based approach similar in general concept to that utilized in a simple painting or drawing application. The user interaction is implemented as a step-wise process providing the user with the necessary options to efficiently create the shareas.

The preferred steps comprise of the creation of individual geometrical objects which represent sharing themes and preferably contain the visual representations of content. Additionally, the definition of individual access rights to the content and also the definition of access rights to the individual geometrical objects is part of the preferred process, wherein the access rights can define access in general or via a simple user list. By graphically arranging the geometrical objects the user will be able to visually create any type of share option to distribute his or her content more efficiently. The preferred workflows and additional specifications regarding the instant invention will be described in more detail below.

As is generally indicated in FIG. 1, at least a portion of the instant invention will be implemented in form of software running on a user's computer 100. Such a computer will have some amount of program memory and hard disc storage (whether internal or accessible via a network) as is conventionally utilized by such units. Additionally it is possible that an external camera 110 of some sort be utilized with—and will preferably be connectible to—the computer so that video and/or graphic information can be transferred to and from the computer. Preferably the camera 110 will be a digital video camera, although that is not a requirement, as it is contemplated that the user might wish to utilize still images from a digital still camera in the creation of his or her multimedia work. Further given the modern trend toward incorporation of cameras into other electronic components (e.g. in handheld computers, telephones, laptops, etc.) those of ordinary skill in the art will recognize that the camera might be integrated into the computer or some other electronic device and, thus, might not be a traditional single-purposes video or still camera. Although the camera will preferably be digital in nature, any sort of camera might be used, provided that the proper interfacing between it and the computer is utilized. Additionally a microphone 130 might be utilized so that the user can add voice-over narration to a specific multimedia work or can control his or her computer via voice-recognition software and, additionally, a CD or DVD burner 120 could be useful for storing content on writable or rewritable media. Additionally, an Internet access device 140, preferably a router, will be connected to the networking card contained in the computer to allow the user to get access to the Internet.

Figure 2:
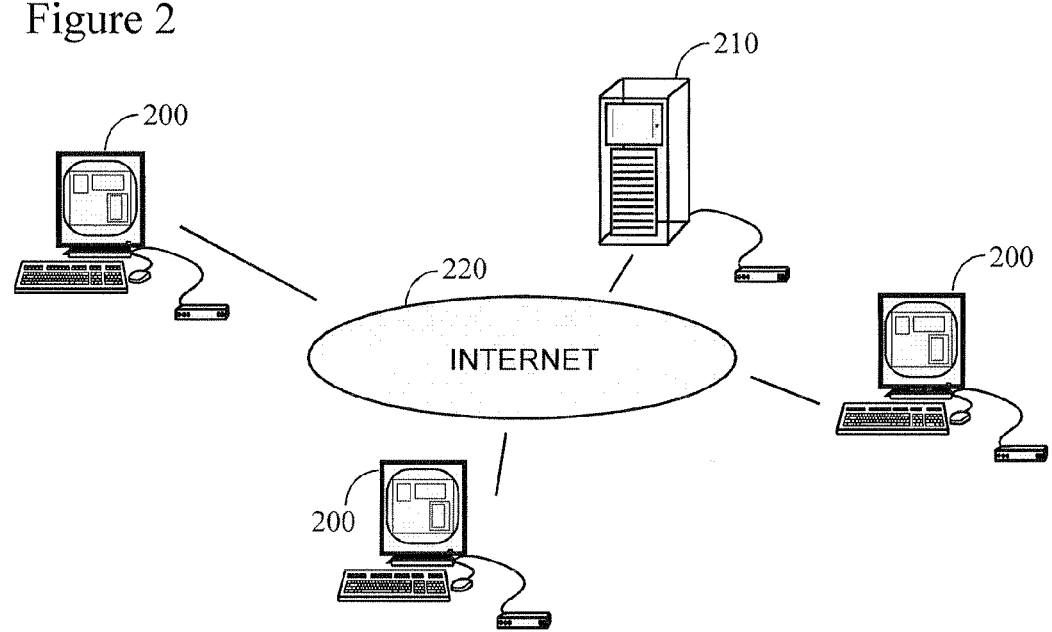
FIG. 2 illustrates a typical hardware topology of the instant invention.

Turning next to FIG. 2, this figure illustrates a typical network topology that would be suitable for use with the instant invention. As is indicated in that figure, a plurality of different computers 200 will be connected to the Internet 220 via a plurality of different access modes, for example dial-up, landline broadband (over coaxial cable, fibre optic or copper wires), Wi-Fi or satellite connection, etc. Multiple computers will preferably be interconnected via the Internet to a server 210 which is also in communication with the Internet. The server 210 manages and controls communications between the web-desktop environments of each user and is an essential part of the functionality of the preferred embodiment of the instant invention. The server will preferably store login information of each user. Note that FIG. 2 should not be interpreted to specifically mean that "one computer=one user" but instead should be broadly interpreted as a schematic illustration of a preferred arrangement only. The server 210 additionally will store the content provided by individual users of the web-desktop environment, wherein this content could comprise personal data (e.g., login information) and data relating to the use of the web-desktop environment (layout and arrangement of the web-desktop).

Figure 3:
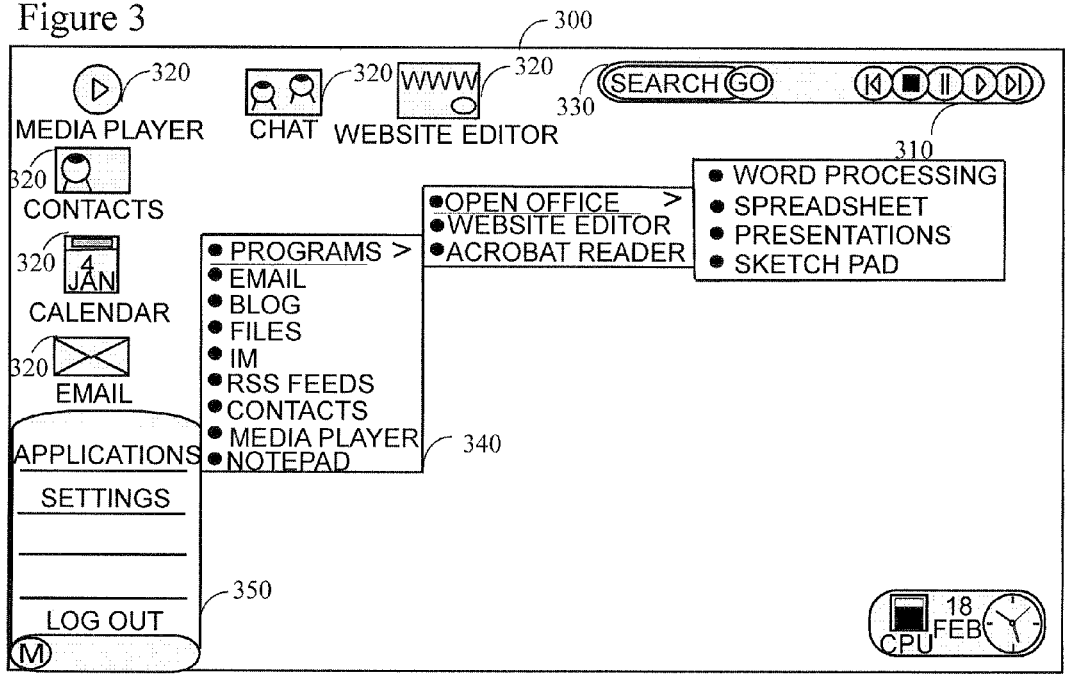
FIG. 3 illustrates the graphical user interface of a typical web-desktop according to the instant invention in a first phase.

As is generally indicated in FIG. 3, in a preferred embodiment a user of the instant invention will be presented with a computer screen display 300 which contains a display of some preferred user interface components. This figure contains an illustration of a preferred web-desktop, wherein the visual layout of web-desktops in general is similar to the visual layout of standard desktops of most of the current operating systems.

Note that, in the preferred embodiment, the web-desktop might provide control possibilities for the playback of multimedia content 310 for the user. Additionally, the user will preferably be provided with selectable icons 320 that will be used to represent commonly requested operations. For example, there might be an icon that corresponds to starting a session of a media player, activating a website editor, activating a website publishing application, accessing a contact list, etc. Additional applications might include an e-mail application, a chat application and a calendar application. It should be noted, however, that those applications mentioned previously are only examples and this listing is not intended in any way to limit the number of available applications in a web-desktop environment. It should be clear to someone with ordinary skill in the art that there are a vast number of applications that might be used within the constraints of a web-desktop environment. Additionally, the user might be provided with an easy access point to an Internet search engine 330. Further, the web-desktop might contain sections through which the user could access the available applications 340 and with which the user could define specific internal functions of the web-desktop 350.

Figure 4:
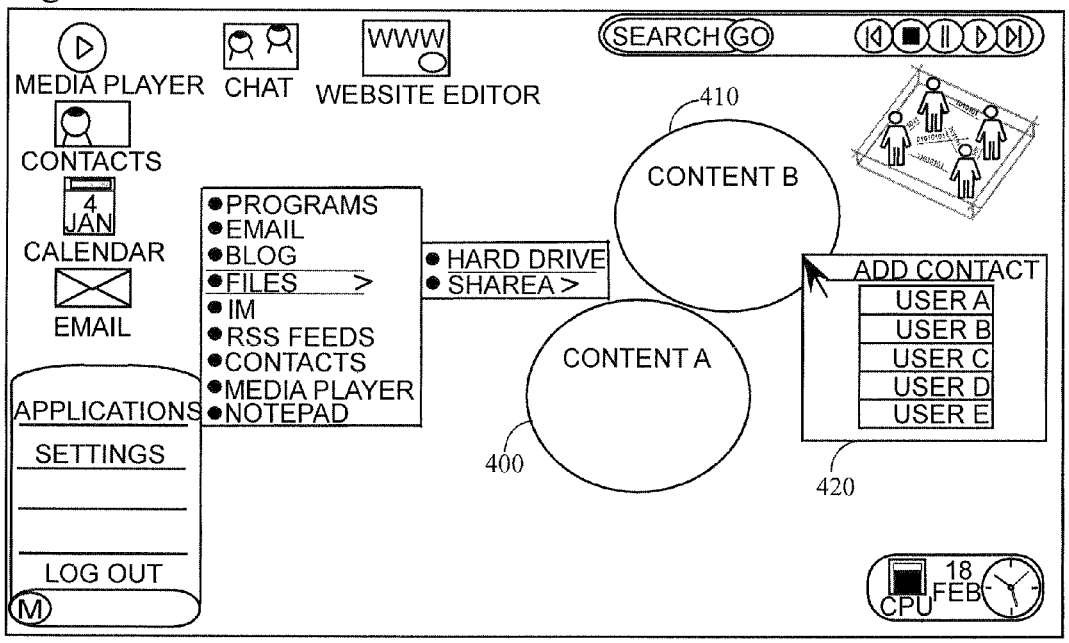
FIG. 4 depicts the graphical user interface of the instant invention in a second phase.

Turning next to FIG. 4, this figure illustrates how the screen of FIG. 3 might appear after the user has elected to initiate the process of the instant invention. The activities regarding the instant invention will be carried out directly on the web-desktop 300 of the user. The user will preferably create one or more arbitrarily formed geometrical object(s) (400, 410) on the web-desktop. Each such object 400/410 preferably points to and/or contains computer files that are different from those pointed to and/or contained within the other objects. In a preferred embodiment, the user will move the created geometrical objects 400/410 on the screen by dragging and dropping them. If a user drops one object on another, the resulting region of intersection will constitute files that are allowed to be shared between multiple users. After the geometrical object is created, the user will preferably specify the files and permissions that are to be associated therewith. Additionally, an object classifier might also be assigned. For example a user might label a geometrical object as "work" and then add work-related documents to that object (e.g., illustrations, word processing documents, spread sheets, etc.).

As a next preferred step, the instant invention will provide the user with a means of specifying the particular contacts which are to have access to the content represented by the created on-screen geometrical object. The preferred control item 420 (FIG. 4) will preferably be automatically filled with user information from an integrated contacts module. The user will be able to choose a single user that he or she wishes to have access to the content or, if so desired, multiple users. The access rights to the parts of the graphical display can be defined in many different ways. In a preferred arrangement, the user will be able to specify which users will have access to the content within the geometrical region under consideration and will preferably further be able to specify individual access rights. For example, user A might be permitted only "read" rights to the files contained within a geometrical region, whereas user C might be given read, write, and delete rights, etc. Additionally, the user will preferably be able to define access rights with respect to individual computer files. As another example, the user might specify that "file 3" may only be viewed by both users D and F but that only user D can edit or otherwise modify the file. Of course, it would certainly be possible to indicate that "no one" or "everyone" can access a given geometrical region if the user so desired. One additional option with respect to access rights will further be described in connection with FIG. 8.

Note that, for purposes of the instant application, the permitted individuals (if any) and their respective permissions will be referred to collectively as the "access rules" for a geometrical region. Additionally, an access rule will be said hereinafter to "implicate" a user if that rule either permits or denies access by that user to a file or if that rule permits restricted access of a user to a file (e.g., by permitting access but granting "read only" rights). Thus, and by way of example, if an access rule permits User 2 to read and modify a file, User 2 will be said to be implicated by that access rule. If the access rule is "everyone may read", then all users will be implicated by that rule. If the access rule is "no one may read", similarly, all users will be implicated by that rule because all have been denied access.

Figure 5:
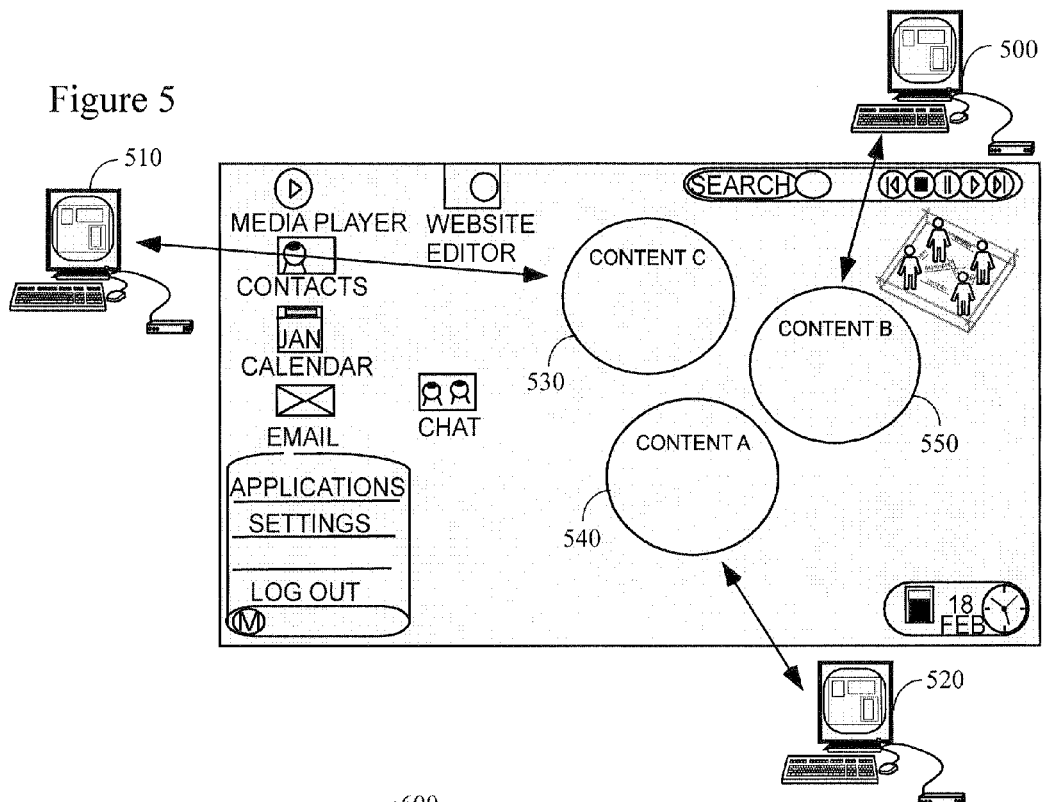
FIG. 5 illustrates a preferred layout of the instant invention after creation of individual "shareas".

FIG. 5 illustrates a web-desktop of an individual with three geometrical objects (530,540,550). In this example, each object (530,540,550) is associated with a different theme and its content is assumed to be consistent with that theme. The user has also specified access rights for three different users. As is indicated in this figure, one user 520 is allowed access to one geometrical object 540, wherein another user 500 is granted access to another geometrical object 550, and the last of the three users is provided access to the third geometrical object 530.

Figure 6:
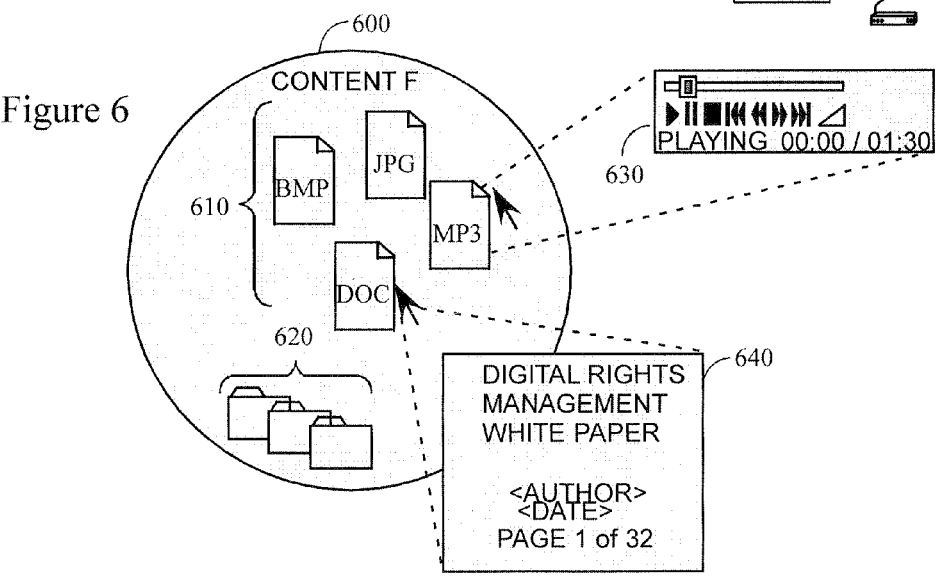
FIG. 6 illustrates a preferred preview functionality of for use with files or documents contained in a "sharea".

Now turning to FIG. 6, this figure illustrates how the content of a particular geometrical object 600 might be presented to a user who has been permitted access to that geometrical object. As is indicated in this figure, several different documents 610 and folders 620 have been placed within region 600 by an initiating user. In this case, additional information 640 with respect to the content of the "DOC" (i.e., Microsoft Word) file has been indicated as being available if the user "mouses over" or "right clicks" that icon.

Additionally, the file type might have been used to indicate the type of contents (e.g., image, document, etc.) and/or the icon might have been a thumbnail representation of the contents of the file. All of these approaches are well known to those of ordinary skill in the art and others will readily be able to devise alternative ways to indicate some file-related information to the user. For example, if the document is an audio file ("MP3" in FIG. 6), the instant invention will preferably provide the user who has the appropriate access rights a control bar 630 that allows the user to listen to all or any part of the shared audio file.

Figure 7:
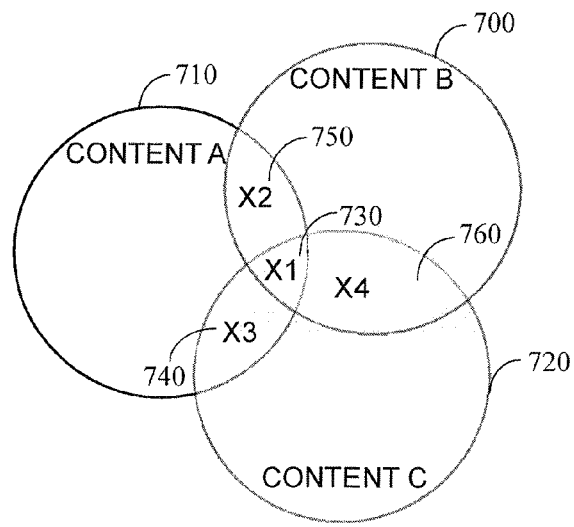
FIG. 7 depicts the layout of a share environment with at least three joint "shareas".

FIG. 7 illustrates three geometrical objects 700, 710, and 720 that have been placed into an overlapping configuration. In a preferred arrangement, the user will create the individual geometrical objects (700,710,720), will define the label and content of each geometrical object (700,710,720), and, will define which content is supposed to be a part of the individual geometric objects (700,710,720).

After doing this, the user will then next preferably be permitted to move the geometrical objects (700,710,720) within the confines of the web-desktop to create intersections between them. As has been generally discussed previously, these intersections will be interpreted by the user's computer as instructions related to the users that will be allowed access to the associated files and the privileges granted to each such user. In this particular figure, the user has created four intersections X1 to X4. For purposes of the instant disclosure, these intersections will be referred to as "shareas" between individual content sections (geometrical objects). For example, content (computer files) that the user puts into the section X1 730 will be shared with each of the users that are associated with the three geometrical objects. Content placed in section X2 750 will be shared with the users that have been associated with geometrical objects 700 and 710. Content that has been placed in section X3 740 will be shared with users with access rights associated with geometrical objects 710 and 720. Finally, content put in section X4 760, will be shared between users with access rights to geometric objects 700 and 720.

Figure 8:
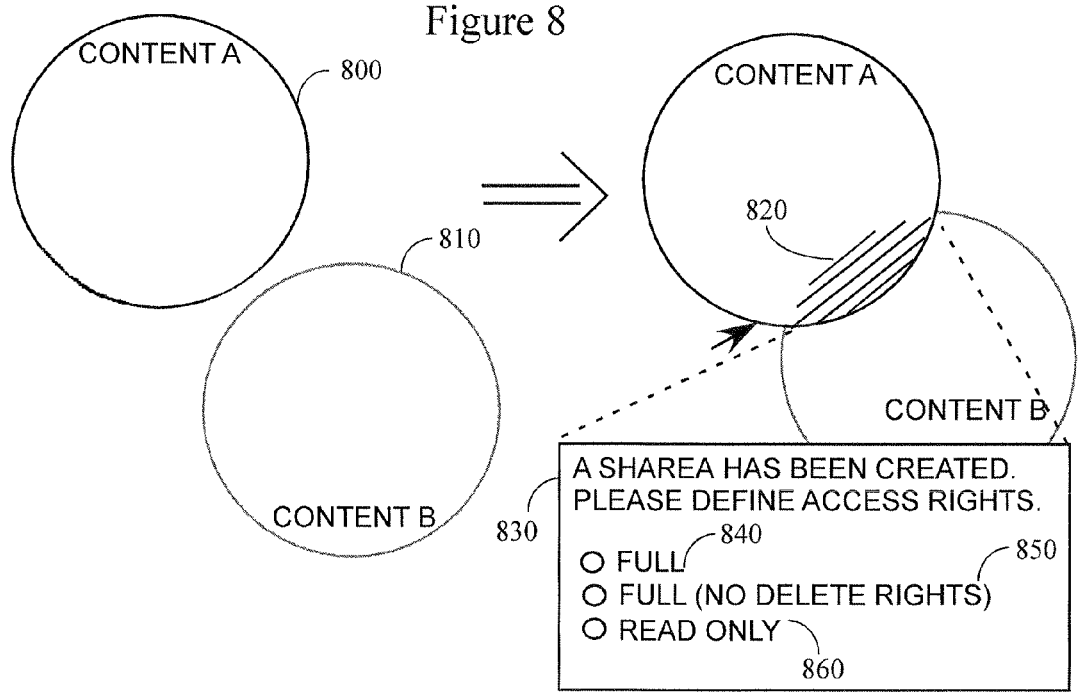
FIG. 8 illustrates a preferred graphical user interface for use when creating intersections between two unique "shareas".

Now turning to FIG. 8, this figure illustrates a preferred response that would be observed when a user decides to move two geometric objects to create intersections. For purposes of illustration, assume that geometrical objects 800 and 810 have been moved into a position where one overlaps the other to create a region of intersection 820. When the user signals that the movement operation is over, the instant invention will preferably automatically display a control 830 which asks the user to define the access right for the newly created intersection 820. The user will be able to give full access 840 to the intersection, in which case every user that has been associated with either geometrical object will have full access rights, e.g., rights to delete, open, modify, read, and create new documents. The user could also select access rights to the intersection which allow all of the foregoing except deletion (option 850). The user might also be permitted to limit access to files within the intersection 820 to only a "read" right (option 860). In a preferred arrangement, each geometric object will preferably have an associated access rights table, wherein the users who are granted access will be stored as well as the content (e.g., pointers to the computer files implicated), and the rules that govern access to the content, if so defined by the user. The access rights for new intersections will preferably be stored only for that intersection and the access rights have a higher priority than any individual access rights assigned to the geometric objects.

Figure 9:
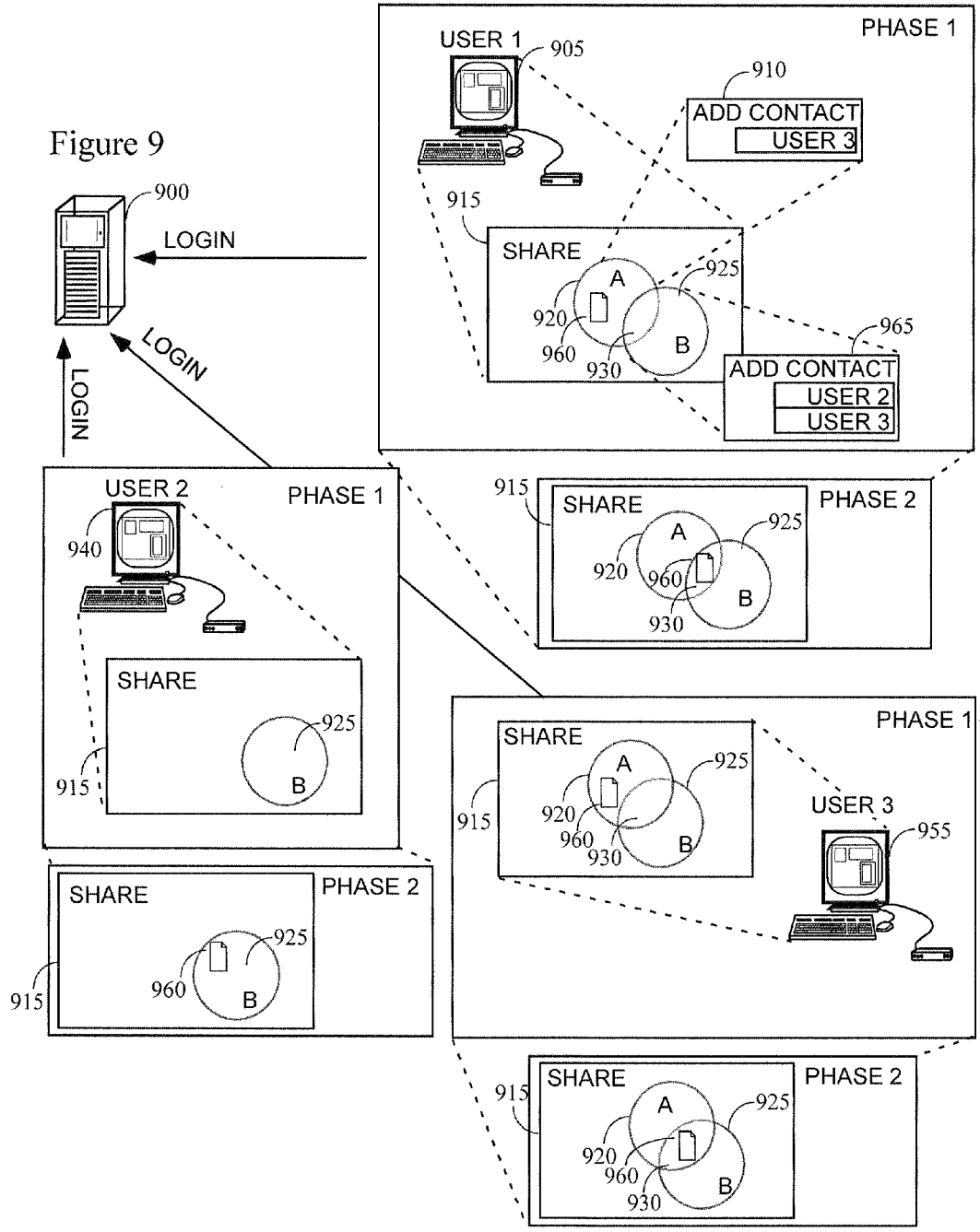
FIG. 9 depicts the preferred environment of the instant invention with three participating users and each user's view of the "shareas".

Turning next to FIG. 9, this figure illustrates a preferred configuration of the instant invention operating with three participants and a server 900 that manages the web-desktop environment. The server 900 will preferably allow each user (905,940,955) to log in to the web-desktop environment, thereafter displaying the web-desktop environment on each users personal computer. In this figure, User 1 905 has created the sharing environment 915 visually on his or her web-desktop (i.e., this is the initiating user). In this example, the User 1 has created two geometrical objects 920 and 925 and also has created an intersection 930 between them. Additionally, User 1 has defined the access rights to both geometric objects, with User 3 having access 910 to files that have been placed within one of the geometric objects 920, and both users having access to files placed within the other geometric object 925. Thus, User 3 has access to files placed within both geometric objects 920 and 925 and User 2 only has access to files within one geometric object 925.

This figure contains separated phases, wherein in phase 1 User 1 stored a data file 960 in geometric object A 920, therewith allowing User 3 access to this data since User 3 has access to all the files within geometric objects 920, 925. User 2 however has, in phase 1, no access to data file 960, since he is not an authorized user for geometric object A 920.

In phase 2, however, User 1 has decided to share the file 960 with both User 2 and User 1 and has moved it into the region of intersection 930 between geometric objects 920 and 925, thereafter allowing User 2 access to the data file 960.

Figure 10:
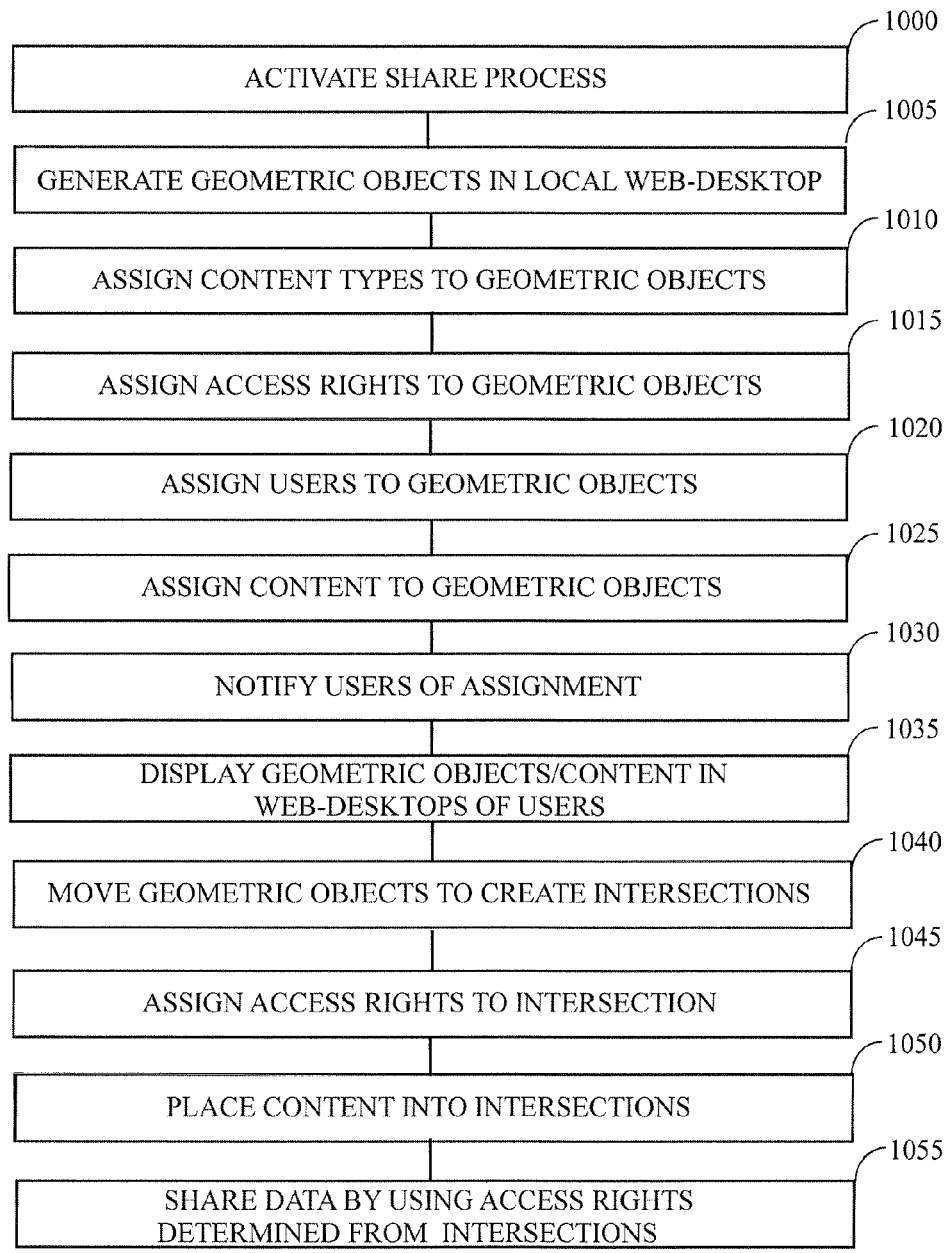
FIG. 10 depicts a flowchart containing a preferred workflow of the instant invention.

FIG. 10 contains a description of a preferred workflow of the instant invention. As a first preferred step, the user will activate the share process 1000 from within the web-desktop operating environment. This will preferably be implemented by selecting an option provided by the web-desktop environment.

As a next preferred step, the user will create geometric objects in his or her local web-desktop 1005, wherein the form/shape and size of the individual geometric objects may be arbitrarily chosen by the user. Additionally, the user will preferably be able to create as many geometric objects as there are types of content that he or she wants to share.

In the next preferred step, the user will assign specific content types or labels 1010 to the individual geometric objects, wherein these types or labels are used as a guide for the user regarding which content he wants to share within each specific geometric object.

As a next preferred step, the user specifies access rights 1015 for each geometric object, wherein these access rights will preferably at least include full access, read only access and full access without delete rights.

In the next preferred step, the user will associate users 1020 with each geometric objects, users with which he or she wants to share content. The information that defines each user (e.g., the user's real name, on-line I.D., screen name, etc.) will then preferably be transferred from the contacts application of the web-desktop to the remote server. In the preferred embodiment, the user will only need to select users from a listing that has been compiled from that user's contact database—it will preferably not be necessary for the user to manually type in contact information at this step.

As a next preferred step the user will add content 1025 to the geometric objects, with the content preferably being transmitted to and stored within the server that manages the web-desktop environment. However, in some instances it might be desirable for the user to also select documents for upload to the web-desktop environment at this point and have them transmitted later when actually requested.

In a next preferred step, the instant invention will inform the users 1030 whose I.D.s have been added to/associated with a geometric object of that fact. Preferably the information will be transmitted immediately if the users are currently logged in to the web-desktop environment and, if the users are not logged in, the instant invention will preferably inform the users of the addition the next time these users log into the web-desktop environment.

In a next preferred step, the instant invention will automatically display the geometric object or the contained content 1035 on the web-desktops of users that have been authorized to access that content. However, note that the phrase "automatically displayed" should be understood to include informing the users by simply transmitting a text or iconic notification to the users.

As a next preferred step, the initiating user will interact with the geometric objects to create intersections 1040 between the geometric objects, wherein the term interacting should be understood to include moving the geometric objects with a mouse or keyboard within the confinements of the web-desktop environment. Manipulation of these icons is the preferred way for the user to implement network-based file sharing with access permissions based on the defined labeled content-specific geometric objects.

In the next preferred step, the user will assign access rights/permissions to the intersections 1045, wherein these access rights are preferably the same as for the individual geometric objects taken as a whole, but the access rights of the intersections will preferably be given a higher priority than those of the geometric objects.

As a next preferred step, the user will transfer content 1050 from the crossed geometric objects into the intersections, wherein the user transfers content that he or she wishes to share with the user base of both geometric objects. However, the user will not be limited to content that is already shared within individual geometric objects, he or she might also add new content into the intersections. In the next preferred step, all participating users can initiate the data sharing process 1055 by accessing the content provided according to the defined access rights.

CONCLUSIONS

Of course, many modifications and extensions could be made to the instant invention by those of ordinary skill in the art. For example, in one preferred embodiment, the participating users would be able to create geometric objects and, by moving these objects, they will be able to create intersections and to share their data with the other users.

Additionally, in some embodiments, it would be desirable to allow each user by default to have, at minimum, visual read access to all content of the initiating user in all geometric objects, giving the participating user the option to label individual content with the request to receive the content from the initiating user.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those show or suggested herein, may be made therein by those skilled in the art, without departing from the spirit of the inventive concept the scope of which is to be determined by the following claims.

What is claimed is:

1. A method of sharing digital content between a plurality of different computers, comprising the steps of:
   (a) establishing a first network connection between a first computer of said plurality of different computers and a remote server;
   (b) displaying a first desktop on a first display device, said first display device being in electronic communication with said first computer;
   (c) manually drawing by a user a first geometric object within said first desktop;
   (d) displaying said first geometric object within said first desktop;
   (e) assigning at least one first access rule to said first geometric object;
   (f) transmitting data representative of said first geometric object and said at least one first access rule to said remote server;
   (g) manually drawing by a user a second geometric object separate from said first geometric object within said first desktop, wherein said first geometric object and said second geometric object do not overlap and wherein said first geometric object and said second geometric object are concurrently displayed;
   (h) displaying said second geometric object within said first desktop;
   (i) assigning at least one second access rule to said second geometric object;
   (j) transmitting data representative of said second geometric object and said at least one second access rule to said remote server;
   (k) manually adjusting a position of said first geometric object to overlap with said second geometric object, thereby creating at least one overlap region;
   (l) simultaneously displaying on said desktop said first geometric object, said second geometric object, and said overlap region;
   (m) automatically determining at least one overlap access rule associated with said at least one overlap region using at least said at least one first access rule and said at least one second access rule;
   (n) positioning a computer file icon to lie within either said first geometric object or said second geometric object, said computer file icon being associated with a computer file;
   (o) determining a location of said computer file icon within said first or second geometric object;
   (p) transmitting to said remote server data representative of said computer file and said computer file icon position within either said first geometric object or said second geometric object;
   (r) establishing a second network connection between a second computer of said plurality of computers and said remote server;
   (s) seeking to transfer said computer file from said first computer to said second computer;
   (t) determining whether to allow transfer of said computer file from said first computer to said second computer depending on said location of said computer file icon within said first or second geometric object, wherein
      (1) if said computer file is positioned within said overlap region, permitting transfer of said computer file according to said at least one overlap access rule,
      (2) if said computer file is positioned within said first geometric object but outside of said overlap region, permitting transfer of said computer file according to said at least one first access rule,
      (3) if said computer file is positioned within said second geometric object but outside of said overlap region, permitting transfer of said computer file according to said at least one second access rule; and,
   (t) transferring said computer file from said first computer to said second computer if so permitted.

2. A method according to claim 1, wherein step (q) comprises the steps of:
   (1) establishing a second network connection between said second computer and said remote server,
   (2) transmitting from said remote server to said second computer via said second network connection at least a portion of said data representative of at least one of said first geometric object, said second geometric object, and said overlap region, (3) transmitting from said remote server to said second computer at least a portion of said data representative of said computer file, (4) displaying on a second display device representations of any of said first geometric object, said second geometric object, and said overlap region using any data so transmitted, said second display device being in electronic communication with said second computer, and, (5) displaying on said second display device a file icon representative of said computer file.

3. A method according to claim 1, wherein said remote server and said first computer and said second computer are connected over the Internet.

4. A method according to claim 1, wherein said first desktop is a web desktop.

5. A method according to claim 1, wherein each of said at least one first access rules is selected from a group consisting of a file-based access rule and a user-based access rule.

6. A method according to claim 5, wherein said file-based access rule is selected from a group consisting of a read-only access rule, a read/write access rule, and a full access rule.

7. A method according to claim 5, wherein said user-based access rule is selected from a group consisting of a rule permitting access by a single user, a rule permitting access by all users in a group, and a rule allowing access by all users.

8. A method according to claim 1, further comprising the steps of:
(u) establishing a third network connection between a third computer and said remote server;
(v) seeking to transfer said computer file from said first computer to said third computer;
(w) determining whether to allow transfer of said computer file from said first computer to said third computer depending on said location of said computer file icon within said first or second geometric object, wherein
(1) if said computer file is positioned within said overlap region, permitting transfer of said computer file according to said at least one overlap access rule,
(2) if said computer file is positioned within said first geometric object but outside of said overlap region, permitting transfer of said computer file according to said at least one first access rule,
(3) if said computer file is positioned within said second geometric object but outside of said overlap region, permitting transfer of said computer file according to said at least one second access rule; and,
(x) transferring said computer file from said first computer to said third computer if so permitted.

9. A method of sharing digital content between a plurality of different computers, comprising the steps of:
(a) establishing a network connection between a first computer and a remote server;
(b) displaying a first desktop on a first display device, wherein said first display device is in electronic communication with said first computer;
(c) manually drawing by a user a first geometric object on said first desktop;
(d) associating at least one access rule with said first geometric object;
(e) concurrently displaying at least one more manually drawn geometric object on said first desktop;
(f) associating at least one access rule with each of said at least one more geometric object;

(g) changing a position of at least one of said concurrently displayed geometric objects to create at least one overlapping region, said overlapping region being displayed on said desktop;
(h) determining at least one access rule for each of said overlapping regions using said at least one access rule associated with each of said geometric objects so overlapped;
(i) placing an icon representative of a computer file within said first geometric object or within one of said at least one more geometric object;
(j) determining at least one file access rule for said computer file from said placement of said icon within said first geometric object or within one of said at least one more region; and,
(k) sharing said computer file with any of said plurality of computers according to said at least one file access rule for said computer file.

10. A method according to claim 9, further comprising the steps of:
(l) establishing a network connection between a second computer and said remote server;
(m) displaying a second desktop on a second display device, said second display device being in electronic communication with said second computer;
(n) transmitting a representation of said first geometric object from said first computer to said second computer;
(o) transmitting a representation of each of said at least one more geometric object from said first computer to said second computer;
(p) transmitting data representative of said computer file from said first computer to said second computer;
(q) displaying said data representative of said first geometric object and said at least one more geometric object within said second desktop;
(r) displaying said data representative of said computer file within said displayed representations of said first geometric object and said at least one more geometric object, thereby displaying a local file icon; and,
(s) within said second desktop, moving said local file icon outside of said displayed representation of said first geometric region and outside of all of said at least one more geometric object, thereby initiating a transfer of said file between said remote server and said second computer.

11. A method according to claim 10, wherein step (n) comprises the steps of:
(n1) transmitting a representation of said first geometric object from said first computer to said remote server, and,
(n2) transmitting said representation of said first geometric region from said remote server to said second computer.

12. A method of sharing digital content between a plurality of users, each of said users having at least one computer associated therewith, comprising the steps of:
(a) selecting one of said users;
(b) selecting one of said at least one computer associated with said selected user;
(c) establishing a network connection between said selected computer and a server;
(d) displaying a desktop on a first display device, said display device being in electronic communication with said selected computer;
(e) manually drawing by said selected user a plurality of concurrently displayed geometric objects within said desktop;

(f) associating at least one access rule with each of said plurality of geometric objects, each of said at least one access rule implicating at least one of said users;

(g) arranging said plurality of geometric objects to create at least one overlap region, said overlap region being displayed on said desktop;

(h) for each of said at least one overlap region,
   (i) identifying which of said plurality of geometric objects created said overlap region,
   (ii) determining for said overlap region at least one overlap access rule, each of said at least one overlap access rule being determined from said access rules of said identified geometric objects;

(i) placing an icon representative of a computer file within at least one of said plurality of geometric objects;

(j) if said icon is placed within an overlap region, selecting said at least one overlap access rule associated with said overlap region which contains said icon, thereby selecting at least one file access rule;

(k) if said icon is not placed within an overlap region, selecting said at least one access rule associated with said geometric object containing said icon, thereby selecting at least one file access rule;

(l) sharing said computer file with any of said plurality of users according to said at least one file access rule, thereby sharing digital content between a plurality of users.

13. A method according to claim 12, wherein said server and each of said at least one computer associated with each user are interconnected via the Internet.

14. A method according to claim 13, wherein said desktop is a web desktop.

15. A method according to claim 13, wherein each of said at least one first access rules is selected from a group consisting of a file-based access rule and a user-based access rule.

16. A method according to claim 15, wherein said file-based access rule is selected from a group consisting of a read-only access rule, a read/write access rule, and a full access rule.

17. A method according to claim 15, wherein said user-based access rule is selected from a group consisting of a rule allowing access by a single user, a rule allowing access by all users in a group, and a rule allowing access by all users.

18. A method according to claim 12, further comprising the steps of:
   (m) selecting a second user different from said selected user;
   (n) selecting one of said at least one computer associated with said second user, thereby selecting a second computer;
   (o) establishing a network connection between said second computer and said remote server;
   (p) displaying a second desktop on a second display device, said second display device being in electronic communication with said selected computer;
   (q) transmitting said computer file to said server;
   (r) if said at least one file access rule allows said second user to access said computer file,
     (i) transmitting said data representative of said computer file from said server to said second computer,
     (ii) receiving within said second computer said data representative of said computer file from said server,
     (iii) using at least a portion of said data representative of said computer file to display on said second desktop an icon representative of said computer file, and,
     (iv) transferring said computer file from said first computer to said second computer if requested by said second user, thereby sharing said computer file with said second user, and,
   (s) if said at least one file access rule does not allow said second user to access said computer file, prohibiting transfer of said computer file from said first computer to said second computer.

19. A method according to claim 18, wherein step (iv) comprises the steps of:
   (i) transferring said computer file from said first computer to said server, and,
   (ii) transferring said computer file from said server to said second computer if requested by said second user, thereby sharing said computer file with said second user.

* * * * *